(No Model.)
H. C. BATES.
WHIFFLETREE HOOK.
No. 310,869. Patented Jan. 20, 1885.
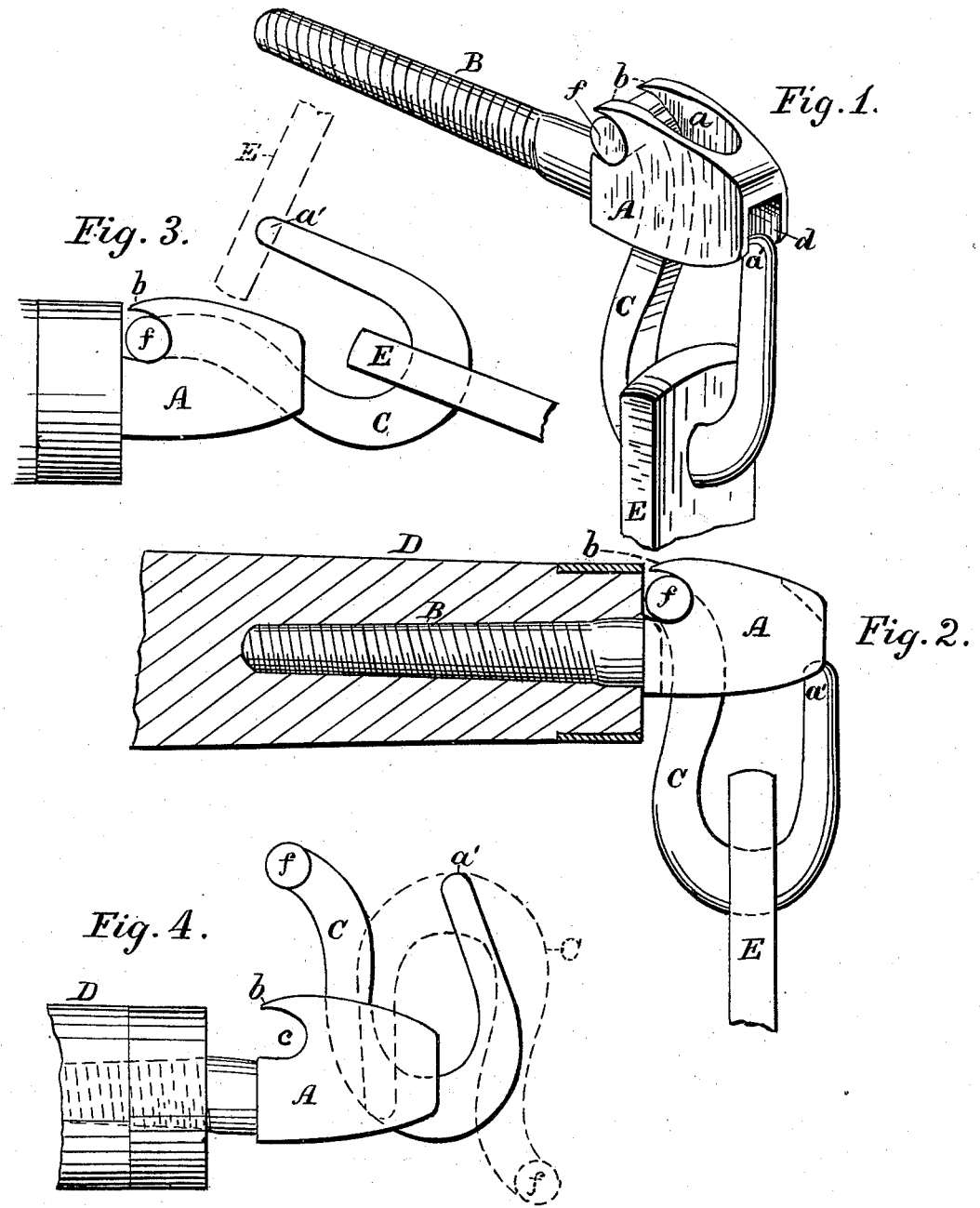
WITNESSES
Horace Harris
H. A. Daniels
INVENTOR
Henry C. Bates
By J. W. Burris
Attorney

UNITED STATES PATENT OFFICE.

HENRY C. BATES, OF MILES, IOWA, ASSIGNOR OF ONE-HALF TO WILLIAM COURTNAGE, OF SAME PLACE.

WHIFFLETREE-HOOK.

SPECIFICATION forming part of Letters Patent No. 310,869, dated January 20, 1885.

Application filed October 13, 1884. (No model.)

*To all whom it may concern:*

Be it known that I, HENRY C. BATES, a citizen of Canada, residing at Miles, in the county of Jackson and State of Iowa, have invented certain new and useful Improvements in Safety Whiffletree-Hooks, of which the following is a specification, reference being had therein to the accompanying drawings.

My invention relates to whiffletree-hooks, constructed with the view of cheapness in manufacture, safety, and convenience in use, as hereinafter fully set forth.

In the accompanying drawings, Figure 1 is a perspective view of the hook and holder. Fig. 2 is a top view of the same attached to a whiffletree, showing the tug attached to a hook. Fig. 3 is a top view showing the hook turned to position to allow the tug to be attached or detached. Fig. 4 is a top view showing the mode of inserting or removing the hook.

A is the head of the hook-holder, formed with a threaded shank, B, and having a central opening, a, extending entirely through the head to receive the hook. The forward and inner portion of the head is bifurcated, as shown at b, and is provided with the curved recess c, forming the seat and bearing for the T-shape head of the hook. The back portion of the outer end of the head A is provided with a recess, d, to receive the point of the hook, as shown.

C is the hook, provided with a T-shape head, f, constructed to fit in the curved bearing c. The head A is made long enough for the point a' of the hook, when in its normal position, to extend into the recess d, as shown in Figs. 1 and 2. The hook being inserted in the head A, as seen in Figs. 1 and 2, the shank is screwed into the end of the whiffletree D, the ends of the bifurcations b approaching near or bearing against the end of the whiffletree, which holds the head f of the hook and allows it to turn freely in its bearings. It will be seen that when the holder is thus attached to the whiffletree a tug, E, placed upon the hook cannot become detached till the hook is turned to the position shown in Fig. 3, and it is evident that the hook must be placed in this position to allow the tug to be placed on the hook. This holder and hook may be cast of malleable iron, or otherwise made of any suitable material, and when either the holder or hook becomes too much worn or is broken it may be readily detached and a new one inserted. When a hook is to be removed or inserted, the shank B is turned outward far enough for the T-head f to pass between the bifurcated head and the end of the whiffletree, when the hook is readily inserted or moved, as illustrated in Fig. 4 of the drawings.

What I claim as new, and desire to secure by Letters Patent, is—

The combination, with the holder A, formed with a threaded shank, B, and having the central opening, a, bifurcated portion b, and recesses c d, of the hook C, provided with the T-shape bearing-head f, constructed to fit and oscillate loosely in the holder, substantially as and for the purpose described.

In testimony whereof I hereunto affix my signature in presence of two witnesses.

HENRY C. BATES.

Witnesses:
   W. W. SANBORN,
   H. F. BOWERS.